(No Model.) 2 Sheets—Sheet 1.
W. G. A. BONWILL.
DENTAL ENGINE.
No. 440,128. Patented Nov. 11, 1890.
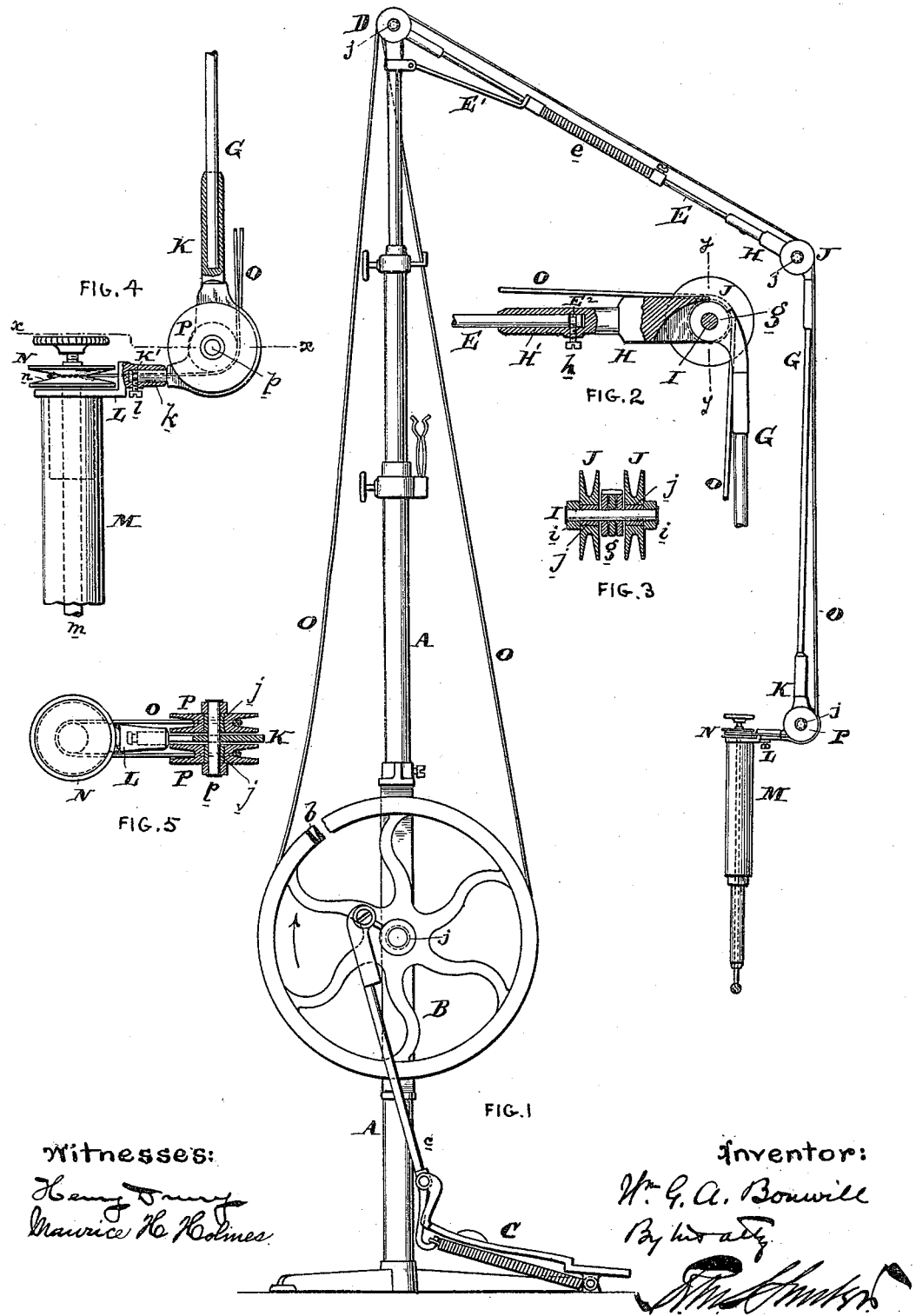

(No Model.) 2 Sheets—Sheet 2.
W. G. A. BONWILL.
DENTAL ENGINE.
No. 440,128. Patented Nov. 11, 1890.
FIG. 10
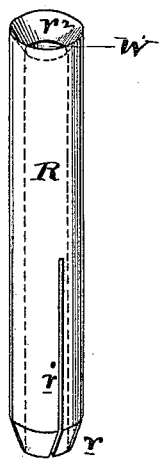
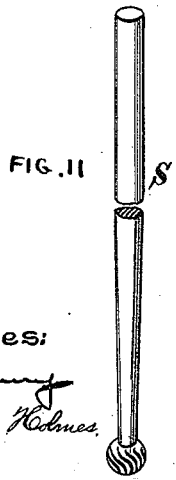
FIG. 11
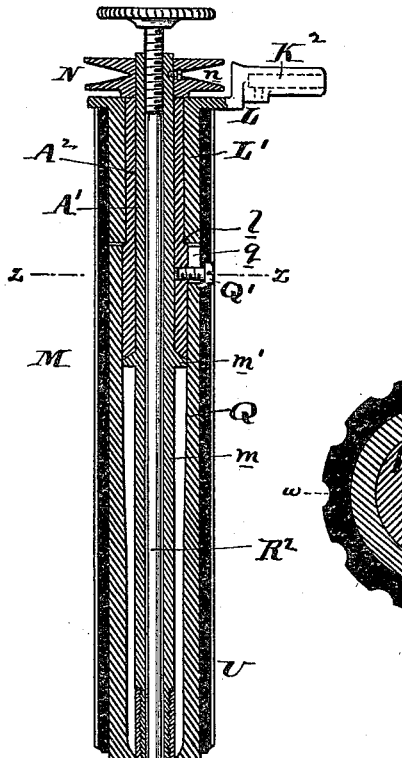
FIG. 6
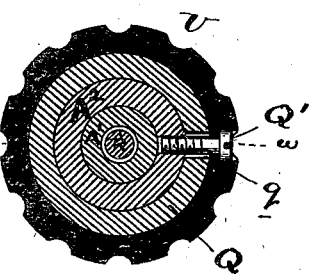
FIG. 7
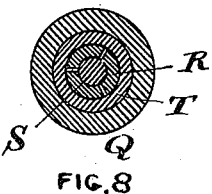
FIG. 8
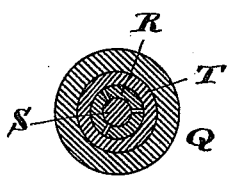
FIG. 9
Witnesses:
Henry Drury
Maurice H. Holmes
Inventor:
Wm G. A. Bonwill
By his atty
THE NORRIS PETERS CO., PHOTO-LITHO., WASHINGTON, D. C.

UNITED STATES PATENT OFFICE.

WILLIAM G. A. BONWILL, OF PHILADELPHIA, PENNSYLVANIA.

DENTAL ENGINE.

SPECIFICATION forming part of Letters Patent No. 440,128, dated November 11, 1890.

Application filed May 7, 1890. Serial No. 350,866. (No model.)

*To all whom it may concern:*

Be it known that I, WILLIAM G. A. BONWILL, of the city and county of Philadelphia, and State of Pennsylvania, have invented an Improvement in Dental or Surgical Engines, of which the following is a specification.

My invention has reference to dental or surgical engines; and it consists of certain improvements, all of which are fully set forth in the following specification, and shown in the accompanying drawings, which form a part thereof.

The object of my invention is to provide a simple construction of power-transmitting mechanism, whereby the hand-piece and connecting flexible arms may be freely moved in all directions without material variation in the length of the operating-cord. Heretofore the joints in the flexible arm and the joint between the flexible arm and hand-piece have been constructed to compensate for all movements of the said flexible arm with respect to the standard and the movements of the hand-piece with respect to the flexible arm, the object being to prevent material variation in the tension upon the operating-cord, the latter being kept under constant and heavy tension, which tension has usually been maintained by the use of a spring acting upon an extensible joint in the flexible arm or by a weight acting upon the driving-cord. This old form of construction of dental engine is illustrated in Letters Patent No. 282,044, granted to me July 31, 1883.

My present improvements are designed to overcome the complication of these old forms of dental and surgical engines and at the same time maintain all the advantageous features thereof, and in addition thereto embody new features of considerable importance in the use of such machines.

With my improved construction I am enabled to use a very loose driving-cord, and thereby overcome the excessive friction which has heretofore been required upon the various movable parts of the engine, and by my being able to use such a loose driving-cord I am permitted to simplify the various constructions employed at the joints and connections in the flexible arm and between the flexible arm and hand-piece. This looseness in the driving-cord also reduces the labor of operating the engine.

My invention also comprehends certain improvements in the chuck or hand-piece, which improvements are fully referred to hereinafter.

Referring to the drawings, Figure 1 is an elevation of a dental or surgical engine embodying my improvements. Fig. 2 is an enlarged view of the hinge joint or elbow connecting the two parts of the flexible arm, with a portion broken away. Fig. 3 is a cross-section of same on line Y Y. Fig. 4 is an enlarged elevation of the joint between the flexible arm and hand-piece and shows a portion thereof in section. Fig. 5 is a cross-section of same on line X X. Fig. 6 is a sectional elevation of the hand-piece through line $w w$ of Fig. 7. Fig. 7 is a cross-section of Fig. 6 on line $z z$. Fig. 8 is a cross-section of the hand-piece on line $s s$ of Fig. 6. Fig. 9 is a cross-section of the hand-piece on line $v v$ of Fig. 6. Fig. 10 is a perspective view of the chuck-clamps removed from the hand-piece and slightly separated, and Fig. 11 illustrates a drill adapted to the hand-piece.

A is the usual standard, to which is pivoted the drive-wheel B, said wheel being preferably light in weight and formed with a very deep and sharp V groove in its periphery.

C is a foot-treadle, and $c$ is a connecting-arm or pitman for operating the drive-wheel B.

To the top of the standard A is hinged the flexible arm, which consists of the parts E and G. The part E is directly hinged to the top of the standard A, and is provided with a coiled spring $e$, which, acting upon the pivoted arm E', tends to support the weight of the hinge-arm and keep it raised when the hand-piece is being held by the operator. Heretofore in many engines it has been customary to make this arm E extensible; but in my improvement such extensibility is not required, and the primary arm E is directly hinged to the standard. The secondary part G of the hinge-arm is hinged to a socket-piece H at I, and the socket-piece H is provided with a socket H', which fits over the end of the primary part E, and is held thereto by means of a screw $h$ fitting in an annular groove $E^2$ on the end of the primary part E. This construction allows the part G and the socket-piece H to revolve freely about the part E as an axis. This hinge-joint between the parts G and H is marked $g$. The pin I is extended upon each side of the hinge-joint and receives the loose sleeves $j$, upon which loosely revolve the two deeply-grooved guide-wheels J J. Nuts or washers $i$ may be placed upon each end of the pin I to hold the sleeves and wheels in position. By the employment of the sleeves $j$, I reduce to a considerable extent the friction and wear which would otherwise exist if the wheels J ran directly upon the pin I. The grooves in the wheels J are as deep as possible to make the diameter at the bottom of the grooves as small as possible, so as not to require a material taking up of the cord for the greatest bending of the joints $g$. While the sleeves $j$ are desirable, it is evident that they might be dispensed with, if desired.

I will now refer to the joint between the flexible arm and the hand-piece, which joint is best shown in Figs. 4 and 5.

K is a rigid elbow-piece having upon one end a socket for receiving the end of the secondary part G of the flexible arm, and about which as an axis it is free to rotate. The other arm of this elbow-piece is formed with a pin $k$, which is received in a socket-piece L of the hand-piece, and to which it is secured by means of a screw $l$ working in an annular groove K' in the pin $k$. To the socket-piece L the hand-piece M is pivoted, so that the operator in holding the hand-piece may move it freely without reference to the connection between the parts L and K. The spindle $m$ of the hand-piece is provided upon its upper end with a wheel N, having a deep V-shaped groove adapted to bite upon the endless cord. Through the elbow K is a pin $p$, upon which is loosely secured, as before, the sleeves $j$, and upon these sleeves are the loosely-supported deeply-grooved guide-wheels P, Fig. 5.

The endless cord O is placed about the drive-wheel B, then over the guide-wheels D at the top of the standard A, thence over the two guide-wheels J of the flexible arm, thence around the two guide-wheels P, and finally passing around the deeply-grooved wheel N of the hand-piece. This endless cord O is preferably loose and well rosined, so that it may run in a loose condition, and yet, in connection with the very deeply-grooved wheels B and N, is well adapted to transmit all the power needed under every circumstance. It is quite evident that the anti-friction sleeves $j$ may be used with the pulleys at D and between the shaft and the drive-wheel B, as indicated in dotted lines in Fig. 1.

The pulleys J and P have their grooves preferably rounded, so as to reduce as far as possible any friction due to the pressure of the cord about these wheels. By making the diameters of the various wheels D and J as small as possible the flexible arm may be moved to the fullest extent without materially taking up the cord O, and such taking up of the cord as actually does take place has no effect upon the running of the machine, in view of the fact that the cord is running very loosely. This has the result of enabling the operator to run his machine uniformly without excessive exertion and permitting the manipulation of the hand-piece to the fullest extent without increasing or decreasing the power required to operate the said hand-piece.

It is evident that the connection of the hand-piece with the flexible arm permits the said hand-piece to be moved with respect to said flexible arm in any necessary direction, and that, too, without materially varying the length of the cord required to maintain the transmitting connection.

By employing a rigid elbow with the loose grooved pulleys at said elbow I greatly simplify the construction and increase the durability of the device over the devices which have heretofore been employed for accomplishing the same purpose. The employment of the rigid elbow and fixedly-located pulleys is made possible by the hinging of the hand-piece on the short arm of the rigid elbow so that it is capable of rotating thereon, and these two features taken together permit of every desired movement without the necessity of the complicated devices for compensating for the different lengths of cords required in other makes of dental and surgical engines. The guide-wheels D and J run upon the axis of the hinge-joints, and consequently do not shift their position with respect to the arms E and G. While the sleeves $j$ are desirable, it is evident that they might be dispensed with, if desired. As far as possible these various guide-wheels J and P are arranged as close together in pairs as is possible, and particularly so with reference to guide-wheels P P, so as to enable a wheel of as small a diameter as possible to be used with the grooved wheel N of the hand-piece.

Referring more specifically to the hand-piece, which is clearly shown in Sheet 2 of the drawings, I have the entire hand-piece M loosely journaled upon the sleeve L' of the part L, and in which it is free to revolve. Journaled in this sleeve is the tubular bearing $A^2$, and journaled within this tubular bearing is the part A' of the spindle $m$ for rotating the operating part, such as the drill S. The spindle $m$ is provided with a conical collar $m'$, which fits against the under end of the tubular bearing $A^2$, and has secured to its upper end the deeply-grooved driven wheel N, which acts as a collar to hold the spindle against longitudinal movement with respect to the bearing $A^2$. Furthermore, the bearing $A^2$ is provided with a shoulder $l$ on its lower part, which fits against the under edge of the sleeve L', and the wheel N at the top extends slightly over the upper portion of the sleeve L', and thus holds the tubular bearing $A^2$ against longitudinal displacement with reference to the sleeve L'.

The lower part of the spindle $m$ is provided with a removable head T, having a conical bearing $t$ at its lower end. In this head T are arranged the two chuck portions or sections R R', which are provided with cylindrical holes W for receiving the shank of the drill S, and have their lower ends made conical, as at $r$, and split, as at $r'$. (See Fig. 10.) The conical part of the piece R fits against the conical bearing $t$ of the head T, and the conical end $r$ of the part R' fits into the conical socket $r^2$ of the upper end of the part R.

A clamping-screw $R^2$, extending through the spindle $m$, is adapted to press upon the upper end of the part R', which is closed, and forces the parts R and R' longitudinally, compressing the split ends through the action of the conical portions, causing them to clamp the shank of the drill at two places in its length. The clamping-screw $R^2$ extends up through the spindle of the hand-piece, and is provided with a milled head or finger-wheel $R^3$, by which it may be turned to operate the chuck.

Inclosing the lower part of the spindle $m$ and the head T is a metallic sleeve Q, which is removable by having a slotted upper end $q$, through which a clamping-screw Q' passes to clamp the said sleeve Q to the tubular bearing $A^2$. A hard-rubber tubular piece U is arranged upon the outside of the sleeve Q and the sleeve L', and is held to the tubular bearing $A^2$ and movable with it independently of the movements of the part L' by means of the clamping-screw Q'. By loosening the screw Q' the screw Q may readily be drawn out, exposing the various parts for oiling. The outside diameter of the sleeve Q and the sleeve L' is preferably the same, so that the tubular hard-rubber sleeve U may fit over both of them, substantially as shown. By this construction it is seen that the bearing for the rapidly-rotating spindle is arranged at the upper part of the hand-piece and close to the place of application of the power. It will furthermore be observed that the hand-piece may be held firmly in the hand while it is revolved about the flexible arm as an axis and while the sleeve L' may be revolved with respect to the tubular bearing $A^2$ as an axis. This permits the chuck, while firmly held in the hand, to have all conceivable movements during the operation of the engine, and at all times the transmitting-power connection is maintained, and practically no variation in the length of the cord is required. This hand-piece might be modified as to details without changing its general construction or the essential features of the invention.

It is evident that while the elbow-piece K is a right-angled piece, said piece might have its two arms arranged at a greater or less angle without departing from the spirit of the invention, and it is also evident that the details may be modified, if so desired.

Having now described my invention, what I claim as new, and desire to secure by Letters Patent, is—

1. In a dental or surgical engine, the combination of a standard, a deeply and sharply grooved drive-wheel, power mechanism for rotating said drive-wheel, a flexible arm hinged to the standard, guide-pulleys at the joints of the flexible arm, a hand-piece flexibly connected with the flexible arm and having a deeply and sharply grooved wheel for operating the movable part of the hand-piece, and a loose rosined endless driving-cord passing about said deeply-grooved guide-wheel and deeply-grooved wheel of the hand-piece and the intermediate guide-wheel of the flexible arm.

2. In a dental or surgical engine, the combination of a standard, a drive-wheel, a flexible arm connected to the standard, a hand-piece, an elbow part pivoted to the flexible arm and carrying the hand-piece, permitting rotation of the hand-piece about said flexible arm as an axis, and a pivoted connection between the elbow part and hand-piece, permitting said hand-piece to move about an axis arranged at an angle to said flexible arm, a deeply-grooved wheel upon the hand-piece, grooved guide-pulleys between the flexible arm and the hand-piece and supported on the elbow part, and an endless driving-cord arranged between the grooved drive-wheel and the grooved wheel of the hand-piece, said cord being guided over the guide-pulleys between the flexible arm and hand-piece.

3. In a dental or surgical engine, the combination of a standard or frame, a grooved drive-pulley pivoted to said frame and adapted to be rotated, a flexible arm hinged to the standard, a rigid elbow-piece carried on the end of the flexible arm, two deeply-grooved guide-pulleys carried by said elbow-piece, a hand-piece pivoted to said elbow on an axis at right angles to the flexible arm and provided with a movable part, a deeply-grooved pulley secured to and operating the movable part arranged close to the guide-pulleys, and an endless cord connecting the drive-wheel with the deeply-grooved wheel on the hand-piece and guided about the guide-pulleys on the elbow-piece.

4. In a dental or surgical engine, the combination of a standard or frame, a grooved drive-pulley pivoted to said frame and adapted to be rotated, a flexible arm hinged to the standard, a rigid elbow-piece carried on the end of the flexible arm by a loose joint, permitting rotation of said elbow-piece about the end of said flexible arm as an axis, two deeply-grooved guide-pulleys carried by said elbow-piece and adapted to rotate about an axis arranged at an angle to the flexible arm, a sleeve provided with an angular socket-piece adapted to be pivotally secured to the rigid elbow-piece, a hand-piece journaled in said sleeve at an angle to its connection with the elbow-piece and provided with a movable part, a deeply-grooved pulley secured to and operating the movable part arranged close to the guide-pulleys on the elbow-piece, and an endless cord connecting the drive-wheel with the deeply-grooved wheel on the moving part of the hand-piece and guided about the guide-pulleys on the elbow-piece.

5. In a dental or surgical engine having a flexible arm, a giving connection between the flexible arm and hand-piece, consisting of the combination of the elbow-piece K, loosely fitted upon the end of the arm and having a pin $k$, deeply-grooved pulleys P P, arranged upon a common axis $p$ and located upon opposite sides of the elbow-piece, loose anti-friction sleeves $j$, arranged between said grooved wheels P and axis $p$, a socket-piece L, loosely journaled upon the pin $k$, a hand-piece M, supported by said socket-piece L, a spindle mounted in the hand-piece and projecting therefrom, and a grooved pulley N, mounted therein and having a diameter substantially equal to the distance apart of the grooves of the two guide-pulleys P P.

6. In a dental or surgical engine, the combination of a flexible arm, a hand-piece having a movable part, a rigid elbow-piece having one arm connected to the end of the flexible arm and the other or free arm arranged at an angle to the hand-piece, an intermediate sleeve-piece pivoted to the free arm of the elbow-piece on one end and at the other end sleeved upon the hand-piece, whereby the hand-piece may rotate in the sleeve and also about the elbow-piece, and flexible power-transmitting devices for operating the movable part of the hand-piece.

7. In a dental or surgical engine, the combination of a flexible arm, a hand-piece, a universal joint between the flexible arm and hand-piece, consisting of a rigid elbow-piece pivoted upon the end of the flexible arm and at right angles to the hand-piece and connected therewith by a hinge or pivot joint, whereby the hand-piece may revolve freely about the flexible arm and also about the rigid elbow-piece, and guide-wheels carried by the elbow-piece for guiding the cord to the hand-piece.

8. In a dental or surgical engine, a giving connection between the flexible arm and hand-piece, consisting of the elbow-piece K, loosely fitted upon the end of the flexible arm and having a pin $k$, deeply-grooved guide-wheels P P, arranged upon a common axis and located upon opposite sides of the elbow-piece, a socket-piece L, loosely journaled upon the pin $k$, a hand-piece M, loosely journaled in the socket-piece L and adapted to rotate in said socket-piece upon an axis lying in a direction corresponding to the flexible arm to which the elbow-piece is secured, a rotating spindle for holding the operating part carried by said hand-piece, and a grooved pulley for the hand-piece having a diameter substantially equal to the distance apart of the grooves of the two guide-pulleys P P.

9. In a dental or surgical engine, the combination of a flexible arm with a rigid elbow at its free end, guide-pulleys at said elbow, a hand-piece connected to said elbow and journaled on an axis arranged in a plane parallel or substantially parallel to the end of the flexible arm to which the elbow is secured, a grooved pulley arranged upon the hand-piece at an angle to the pulleys upon the elbow, and a power-transmitting band passing about the guide-pulleys and pulley upon the hand-piece.

10. In a dental or surgical engine, the combination of a flexible arm, a hand-piece journaled at its upper end upon a sleeve and provided with a deeply-grooved wheel for rotating the spindle of the hand-piece, a joint between the journal of the hand-piece and the flexible arm, whereby the hand-piece is held at a substantially fixed distance from the end of the flexible arm and movable about an axis arranged transversely to the said arm and directed toward the hand-piece, and guide-pulleys for guiding the driving-cord from said flexible arm around the deeply-grooved wheel of the hand-piece.

11. In a hand-piece for dental or surgical engines, the combination of a tubular bearing, a spindle journaled in said bearing and having a grooved wheel upon its free end, two tubular clamping portions R R', arranged in the lower part of the spindle and having their lower ends made conical and split, and respectively adapted to conical sockets $t$ and $r^2$, arranged, respectively, on the spindle and the part R, and a clamping-screw for forcing said parts R R' toward the conical socket $t$.

12. In a hand-piece for dental or surgical engines, the combination of a tubular bearing, a spindle journaled in said bearing and having a grooved wheel upon its free end, two tubular clamping portions R R', arranged in the lower part of the spindle and having their lower ends made conical and split, and respectively adapted to conical sockets $t$ and $r^2$, arranged, respectively, on the spindle and the part R, a clamping-screw for forcing said parts R R' toward the conical socket $t$, a supporting-sleeve portion L L', in which the tubular bearing is journaled, a sleeve Q, detachably connected to the tubular bearing and inclosing the lower part of the spindle, and a tubular sleeve, to be grasped by the hand, secured to the tubular bearing and extending over the parts Q and L'.

13. A chuck for a hand-piece, consisting of a rotating spindle having a conical socket upon its lower end, combined with two tubular or clamping sections R R', having their lower ends made conical and split, and having the upper end of the part R made with a conical socket for the reception of the conical end of the part R', and a clamping-screw carried by the spindle adapted to force said clamping-sections R R' longitudinally with respect to each other and the spindle.

14. A chuck for a hand-piece, consisting of a rotating spindle having a conical socket upon its lower end, combined with two tubular clamping-sections R R', the part R having an aperture entirely through it, and the part R' having an aperture only part way through it, and also having their lower ends made conical and split, and having the upper end of the part R made with a conical socket for the reception of the conical end of the part R', and a clamping-screw carried by the spindle adapted to force said clamping-sections R R' longitudinally with respect to each other and the spindle.

In testimony of which invention I have hereunto set my hand.

WM. G. A. BONWILL.

Witnesses:
R. M. HUNTER,
A. J. DUNN.